(12) United States Patent
Eto et al.

(10) Patent No.: US 12,251,682 B2
(45) Date of Patent: Mar. 18, 2025

(54) METAL TRAPPING, METHOD FOR MANUFACTURING METAL TRAPPING, AND FLUID CATALYTIC CRACKING CATALYST

(71) Applicant: JGC CATALYSTS AND CHEMICALS LTD., Kawasaki (JP)

(72) Inventors: Mayumi Eto, Kitakyushu (JP); Takaki Mizuno, Kitakyushu (JP); Tomohiro Mitsui, Kitakyushu (JP); Hiroshi Yamazaki, Kitakyushu (JP); Hiroki Hasegawa, Kitakyushu (JP)

(73) Assignee: JGC Catalysts and Chemicals Ltd., Kanagawa (JP)

( * ) Notice: Subject to any disclaimer, the term of this patent is extended or adjusted under 35 U.S.C. 154(b) by 727 days.

(21) Appl. No.: 17/311,790

(22) PCT Filed: Nov. 8, 2019

(86) PCT No.: PCT/JP2019/043846
§ 371 (c)(1),
(2) Date: Jun. 8, 2021

(87) PCT Pub. No.: WO2020/129455
PCT Pub. Date: Jun. 25, 2020

(65) Prior Publication Data
US 2022/0023836 A1     Jan. 27, 2022

(30) Foreign Application Priority Data

Dec. 21, 2018   (JP) .................................. 2018-239207
Mar. 22, 2019   (JP) .................................. 2019-054843
Aug. 1, 2019    (JP) .................................. 2019-142015

(51) Int. Cl.
*B01J 21/04*          (2006.01)
*B01J 6/00*           (2006.01)
(Continued)

(52) U.S. Cl.
CPC ............... *B01J 21/08* (2013.01); *B01J 6/001* (2013.01); *B01J 21/04* (2013.01); *B01J 23/04* (2013.01);
(Continued)

(58) Field of Classification Search
CPC ... B01J 21/04; B01J 21/08; B01J 21/10; B01J 21/12; B01J 21/14; B01J 21/16;
(Continued)

(56) References Cited

U.S. PATENT DOCUMENTS 3,446,727  A  *  5/1969  Secor ...................... B01J 21/16
                                                     208/120.25
4,369,130  A  *  1/1983  Bertolacini .......... B01D 53/508
                                                     208/120.25
(Continued)

FOREIGN PATENT DOCUMENTS

JP      08504397 A      5/1996
JP      2013506548 A    2/2013
(Continued)

OTHER PUBLICATIONS

Japanese Notice of Reasons for Refusal for Japanese Application No. 2018-239207, dated Aug. 23, 2022, with translation, 6 pages.
(Continued)

*Primary Examiner* — Cam N. Nguyen
(74) *Attorney, Agent, or Firm* — Buchanan Ingersoll & Rooney PC

(57) ABSTRACT

A production method comprises the steps of obtaining a mixed slurry by adding an alumina component and at least one selected from an alumina component and a clay mineral to a binder containing a silicon oxide; obtaining a metal trapping precursor by mixing the mixed slurry with a compound of a first metal component and heating the mixed slurry of metal component; and obtaining a metal trapping
(Continued)

by drying and calcining the metal trapping precursor. A metal trapping comprises: a binder mainly containing silicon oxide, one or two selected from an alumina component and a clay mineral, and an oxide of a first metal component; having no peak of silicate of the first metal component detected in X-ray diffraction analysis, having an attrition resistance index CAI within a predetermined range. A fluid catalytic cracking catalyst comprises the metal trapping, a zeolite component, a binder component, and a clay mineral component.

14 Claims, 1 Drawing Sheet

(51) Int. Cl.
   *B01J 21/08* (2006.01)
   *B01J 21/10* (2006.01)
   *B01J 21/12* (2006.01)
   *B01J 21/14* (2006.01)
   *B01J 21/16* (2006.01)
   *B01J 23/02* (2006.01)
   *B01J 23/04* (2006.01)
   *B01J 23/10* (2006.01)
   *B01J 35/40* (2024.01)
   *B01J 35/61* (2024.01)
   *B01J 35/64* (2024.01)

(52) U.S. Cl.
   CPC .............. *B01J 23/10* (2013.01); *B01J 35/40* (2024.01); *B01J 35/612* (2024.01); *B01J 35/615* (2024.01); *B01J 35/643* (2024.01)

(58) Field of Classification Search
   CPC ... B01J 23/02; B01J 23/10; B01J 35/40; B01J 35/612; B01J 35/615; B01J 35/643; B01J 6/001
   USPC .......................................... 502/300, 302–304
   See application file for complete search history.

(56) References Cited

U.S. PATENT DOCUMENTS

| | | | | |
|---|---|---|---|---|
| 4,830,840 | A * | 5/1989 | Bhattacharyya | B01J 23/005 208/120.25 |
| 4,904,627 | A * | 2/1990 | Bhattacharyya | C01B 17/79 502/524 |
| 4,985,385 | A * | 1/1991 | Williams | B01J 23/755 502/320 |
| 5,248,642 | A * | 9/1993 | Kumar | B01J 23/10 502/65 |
| 5,288,675 | A * | 2/1994 | Kim | B01J 23/10 502/341 |
| 5,292,703 | A * | 3/1994 | Young | B01J 23/83 502/302 |
| 5,300,469 | A | 4/1994 | Deeba et al. | |
| 5,322,619 | A * | 6/1994 | Davis | B01J 23/10 208/89 |
| 5,384,041 | A | 1/1995 | Deeba et al. | |
| 5,399,327 | A * | 3/1995 | Kim | C10G 11/04 423/244.09 |
| 5,407,878 | A * | 4/1995 | Kim | B01J 23/22 502/41 |
| 5,603,823 | A * | 2/1997 | Kim | C10G 11/05 208/120.25 |
| 5,627,123 | A * | 5/1997 | Kim | B01J 37/03 502/341 |
| 6,225,255 | B1 * | 5/2001 | Shibasaki | C10G 11/04 502/240 |
| 7,576,025 | B2 * | 8/2009 | Kuehler | C10G 11/182 502/79 |
| 8,043,992 | B2 * | 10/2011 | Hatanaka | C01B 3/52 502/328 |
| 8,242,046 | B2 * | 8/2012 | Morikawa | B01J 37/03 502/304 |
| 9,120,085 | B2 * | 9/2015 | Suzuki | B01J 23/60 |
| 9,533,298 | B2 * | 1/2017 | Gokak | B01J 23/02 |
| 9,597,668 | B2 * | 3/2017 | Liang | B01J 37/0207 |
| 9,993,810 | B2 * | 6/2018 | Sutovich | C10G 11/05 |
| 10,005,072 | B2 * | 6/2018 | Kumar | B01J 21/10 |
| 10,464,046 | B2 * | 11/2019 | Lee | B01J 35/002 |
| 11,332,675 | B2 * | 5/2022 | Stockwell | B01J 37/038 |
| 11,643,333 | B2 * | 5/2023 | Jaroniec | C01F 7/021 423/115 |
| 11,827,853 | B2 * | 11/2023 | Stockwell | B01J 37/0036 |
| 2014/0007493 | A1 * | 1/2014 | Henry | B01J 37/0045 502/64 |

FOREIGN PATENT DOCUMENTS

| | | |
|---|---|---|
| JP | 2018167213 A | 11/2018 |
| WO | 2011041401 A2 | 4/2011 |

OTHER PUBLICATIONS

Japanese Notice of Reasons for Refusal for Japanese Application No. 2019-054843, dated Aug. 23, 2022, with translation, 6 pages.
International Search Report and Written Opinion for International Application No. PCT/JP2019/043846, dated Feb. 10, 2020, 6 pages.
Ohishi, Y., "Measuring Method of Abrasion and Attrition Resistance of Catalyst," 1996, vol. 13(1), 4 pages, Catalysts and Chemicals Giho (with English translation).

* cited by examiner

METAL TRAPPING, METHOD FOR MANUFACTURING METAL TRAPPING, AND FLUID CATALYTIC CRACKING CATALYST

CROSS REFERENCE TO RELATED APPLICATIONS

This is the U.S National Phase application of PCT/JP2019/043846, filed Nov. 8, 2019, which claims priority to Japanese Patent Application No. 2018-239207, filed Dec. 21, 2018, Japanese Patent Application No. 2019-054843, filed Mar. 22, 2019 and Japanese Patent Application No. 2019-142015, filed Aug. 1, 2019, the disclosures of each of these applications being incorporated herein by reference in their entireties for all purposes.

FIELD OF THE INVENTION

The present invention relates to the technical field of trapping and passivating vanadium as one of the poisoning elements for fluid catalytic cracking catalysts in a catalytic cracking reaction process.

BACKGROUND OF THE INVENTION

Due to increase in the ratio of residual oil processing in refineries, development or improvement of fluid catalytic cracking catalysts for residual oil processing (RFCC) is urgently required. One of the problems with RFCC is that the concentration of catalyst-poisoning metals (Ni and V) contained in crude oil (or residual oil) is high, so that damage to catalysts is large. As a measure to mitigate the effect, an element having good affinity with the poisoning metals (poisoning metal trapping) is added to the fluid catalytic cracking catalyst (FCC), or a certain amount of a co-catalyst (additive) with a high content of an element having good affinity is blended into the FCC catalyst. These measures are taken on the basis of idea of trapping the poisoning metal as a certain crystal phase to mitigate the adverse effect on the catalytic activity.

For example, it is known that vanadium present as an impurity in raw oil forms vanadic acid in an atmosphere of the regeneration tower for regenerating a fluid catalytic cracking catalyst so as to cause crystal destruction and activity reduction of zeolite in the fluid catalytic cracking catalyst. A method in which a component capable of trapping vanadium is incorporated into the fluid catalytic cracking catalyst and a method in which the component as additive is mixed with the matrix catalyst are therefore employed.

Patent Literature 1 discloses an additive containing free magnesium oxide and a magnesium silicate cement binder produced on site as the additive to be added to a fluid catalytic cracking catalyst for passivation of vanadium, and a production method thereof. The additive has a low surface area and minimal cracking activity.

Further, Patent Literature 2 discloses as metal trapping particles used for metal passivation during fluid catalytic cracking, dry particles composed of kaolin, magnesium oxide or magnesium hydroxide and calcium carbonate with a magnesium oxide content of at least 10 wt %.

PATENT LITERATURE

Patent Literature 1: Japanese Translation of PCT International Application Publication No. H08-504397

Patent Literature 2: Japanese Translation of PCT International Application Publication No. 2013-506548

SUMMARY OF THE INVENTION

However, the conventional art has a problem that deterioration of the fluid catalytic cracking catalyst cannot be sufficiently suppressed.

An object of the present invention is to provide a metal trapping capable of trapping and passivating vanadium as one of the poisoning elements for fluid catalytic cracking catalysts used in a catalytic cracking reaction process of hydrocarbon oil so as to suppress deterioration of the fluid catalytic cracking catalysts, with the high catalyst activity being maintained, and a production method thereof.

Another object of the present invention is to provide a fluid catalytic cracking catalyst containing the metal trapping.

Under such technical background, as a result of intensive studies to solve the problem, the inventors have found that a metal trapping for suppressing deterioration of a fluid catalytic cracking catalyst can be obtained by dispersing a compound of group 2 elements into a binder mainly containing silicon oxide and one or two selected from an alumina component and a clay mineral, so that the present invention has been developed.

The present invention to achieve the objects through solving the problem is as follows. That is, exemplary embodiments of the present invention first provides a metal trapping comprising a binder mainly contains silicon oxide, one or two selected from an alumina component and a clay mineral, and a compound of group 2 elements as a first metal component, having no peak of silicate of the first metal component detected in X-ray diffraction analysis, having an attrition resistance index CAI within a predetermined range.

With regard to the metal trapping according to embodiments of the present invention, it is presumed that the following may be more preferred solution to the problem.

(1) The silicon oxide is prepared as an aqueous solution or fine particles (sol).

(2) The silicon oxide (silica-based) fine particles (sol) have an average particle size in the range of 4 to 100 nm.

(3) The content of the binder in terms of oxide is in the range of 10 to 30 mass % with respect to the metal trapping.

(4) The content of the alumina component and the clay mineral in terms of oxide is in the range of 5 to 40 mass % in total with respect to the metal trapping.

(5) The metal trapping has an average particle size in the range of 40 to 100 μm, a specific surface area in the range of 3 to 200 m$^2$/g, and a pore volume of 0.05 to 0.50 ml/g.

(6) The first metal component comprises magnesium and calcium.

(7) The content of the first metal component in terms of oxide is 20 to 80 mass % with respect to the metal trapping.

(8) The content of an alkali metal M in the metal trapping is 2.0 mass % or less in terms of oxide $M_2O$.

(9) The metal trapping further contains an oxide of rare earth element as second metal component.

(10) The second metal component is one or two selected from lanthanum and cerium.

(11) The content of the second metal component is 20 mass % or less in terms of oxide with respect to the metal trapping.

(12) The content ratio of the second metal component to the first metal component in terms of oxide is 0.01 to 0.20.

Also, exemplary embodiments of the present invention secondly proposes a production method of any one of the metal trappings characterized by comprising a first step of obtaining a mixed slurry of silicon oxide (silica-based) by adding at least one selected from an alumina component, an alumina component precursor and a clay mineral to a binder containing a silicon oxide (silica-based); a second step of obtaining a metal trapping precursor by mixing the mixed slurry of silicon oxide (silica-based) with a compound of the first metal component, and further, optionally with a compound of the second metal component, and heating the mixed slurry of metal component; and a third step of obtaining a metal trapping by drying and calcining the metal trapping precursor.

With regard to the production method of the metal trapping according to embodiments of the present invention, it is presumed that the following may be more preferred solution to the problem.

(13) A washing step is added between drying and calcining in the third step.

The present invention according to exemplary embodiments thirdly provides a fluid catalytic cracking catalyst characterized by comprising any one of the metal trappings, a zeolite component, a binder component, and a clay mineral component.

With regard to the fluid catalytic cracking catalyst according to embodiments of the present invention, it is presumed that the following may be more preferred solution to the problem.

(14) An additive having an active matrix component is further contained.

In embodiments of the present invention, a metal trapping comprises a binder mainly containing silicon oxide to which one or two selected from an alumina component and a clay mineral added, and a compound of group 2 elements as metal component such as magnesium and calcium having a function for trapping vanadium dispersed therein. Further, the silicate of the metal component is not formed therein. Accordingly, the attrition resistance of the metal trapping can be improved, the deterioration of the fluid catalytic cracking catalyst can be suppressed, and each of the compounds used can be effectively utilized.

Therefore, according to embodiments of the present invention, the utilization rate of each of the compounds is high and the amount of each of the compounds used can be suppressed.

DETAILED DESCRIPTION OF EMBODIMENTS OF THE INVENTION

Figure 1:
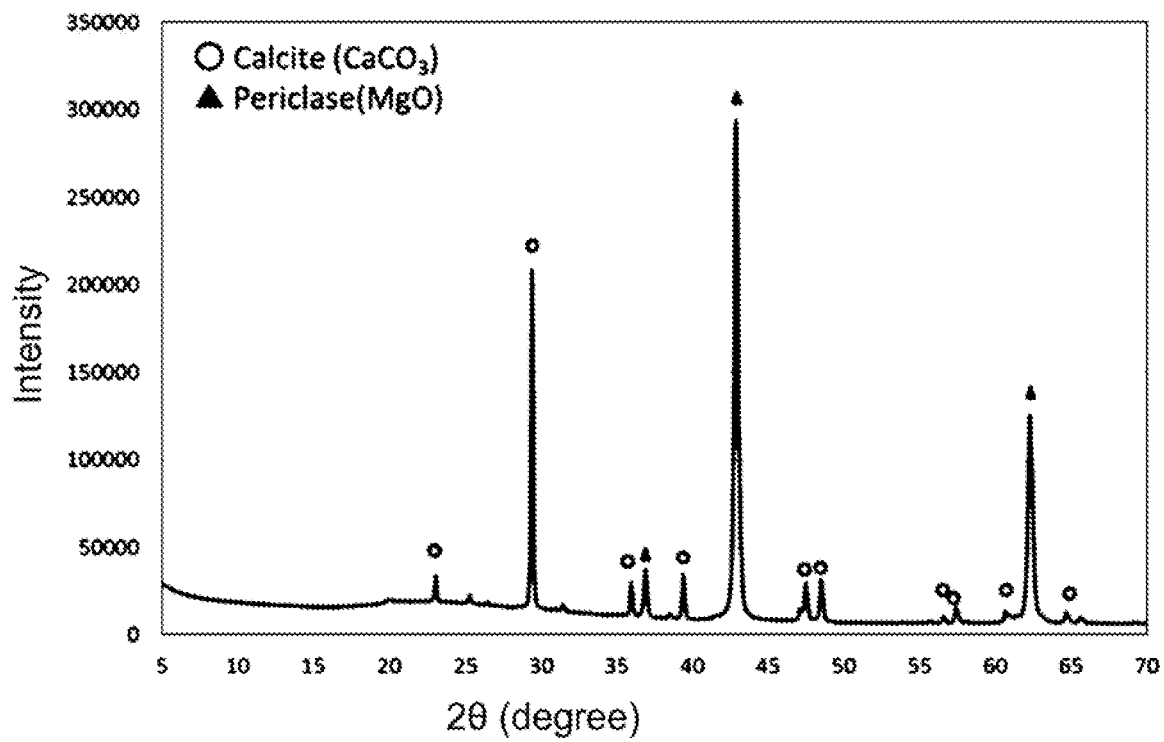
FIG. 1 is a graph showing an X-ray diffraction intensity of a metal trapping MTR-11 calcined at 600° C. in an embodiment of the present invention.

Hereinafter, preferred embodiments of the present invention will be described in detail.
[Metal Trapping]

A metal trapping according to embodiments of the present invention comprises a binder mainly containing silicon oxide (silica-based) to which one or two selected from an alumina component and a clay mineral added, and a metal compound having a function for trapping vanadium (V) dispersed therein.

<Binder Component>

The binder used in embodiments of the present invention is mainly composed of silicon oxide (silica-based). The binder may contain an oxide of Ti in addition to silicon oxide. The content of Ti oxide is preferably 1 to 20 mass % in the mass of the binder.

Use of silicon oxide as a main component in the binder of the metal trapping according to embodiments of the present invention has advantages that the metal trapping with a metal component dispersed in a silica-based binder is thermally more stable than other metal trappings supported on a carrier mainly composed of titanium oxide, rarely causing phase transition, having a strong interaction with a compound having a function for trapping vanadium (V), allowing the metal component to be easily dispersed on the surface of the metal trapping. In addition, the attrition resistance of the metal trapping is improved.

The silicon oxide (silica-based) is preferably prepared using an aqueous solution such as water glass or fine particles, and in the case where fine particles are selected, the average particle size of the fine particles is preferably in the range of 4 to 100 nm. With an average particle size of less than 4 nm, fine particles cannot be present. On the other hand, with an average particle size of more than 100 nm, the strength as metal trapping may not be maintained. More preferably, the average particle size of the silicon oxide (silica-based) fine particles is in the range of 4 to 80 nm, still more preferably 4 to 50 nm.

The average particle size of the silicon oxide (silica-based) fine particles is determined by the following method. The specific surface area SA ($m^2/g$) of the silica-based fine particles is measured by the BET method, and the average particle size is calculated by the following formula.

$$\text{Average particle size (nm)} = 6000/\{SA(m^2/g) \times \rho(g/cm^3)\}$$

Here, $\rho$ is the density of the silicon oxide (silica-based) fine particles, which is 2.2 $g/cm^3$.

The content of the binder mainly containing silicon oxide (silica) is preferably in the range of 10 to 30 mass % in terms of oxide with respect to the metal trapping. With a content of the binder of less than 10 mass %, the strength as metal trapping may not be maintained, while with a content of more than 30 mass %, the binder covers the surface of the oxide or carbonate of group 2 elements, so that the trapping performance and the diffusiveness may be reduced. More preferably, the binder content is in the range of 10 to 25 mass %.

<Alumina Component>

As the alumina component, alumina and an alumina component precursor that produces alumina in the production process of the metal trapping according to embodiments of the present invention such as alumina hydroxide, (pseudo) boehmite, and basic aluminum chloride are used. Preferably pseudo boehmite (boehmite sol) is selected. The alumina component has functions of maintaining the shape and attrition resistance of the catalyst and maintaining the pore structure.

<Clay Mineral>

As the clay mineral, kaolin, halloysite, diatomaceous earth, acid clay, activated clay, etc., are used, and preferably kaolin is selected. The clay mineral component fed into the reaction liquid in advance has functions to suppress a reaction between the metal component (alkaline earth) and the binder component, as well as to be a filler.

The content of the alumina component and the clay mineral in terms of oxide is preferably in the range of 5 to 40 mass %, more preferably 5 to 30 mass %, with respect to the metal trapping.

<Metal Compound Component>

To the binder mainly containing silicon oxide (silica-based), a compound of group 2 elements, for example, an oxide or a carbonate, or a precursor thereof (hereinafter referred to as a first metal component) is added as a metal component. In the case where the precursor is added to a silica-based binder, the precursor forms into a desired compound by heat treatment.

It is preferable that the first metal component contain both of Mg and Ca. The content of the first metal component is preferably 20 to 80 mass % in terms of oxide with respect to the metal trapping.

In the case where the content of the first metal component is excessively less than 20 mass % in terms of oxide, the metal trapping ability necessary for the reaction may not be ensured, while in the case where the content is excessively more than 80 mass %, the metal component easily aggregates, so that the dispersion may be inhibited.

It is preferable that the MgO content be in the range of 15 to 60 mass %, and the CaO content be in the range of 5 to 20 mass %.

To the metal component, a rare earth element (REM: Rare Earth Metal) may be further added as a second metal component, preferably including, for example, one or two selected from lanthanum (La) and cerium (Ce). The content of the second metal component is preferably 20 mass % or less in terms of oxide with respect to the metal trapping. The second metal component functions as a co-catalyst for the first metal component, and the content thereof in terms of oxide as mass ratio (second metal component)/(first metal component) is preferably in the range of 0.01 to 0.20. With a mass ratio of less than 0.01, the effect of the co-catalyst by the second metal component is small, while with a mass ratio of more than 0.20, the aggregation of the active metal component easily proceeds, so that the catalytic performance is reduced.

<Alkali Metal>

In the metal trapping according to embodiments of the present invention, an alkali metal (M) in sodium type, lithium type, etc. are included, and the content of M is preferably 2.0 mass % or less in terms of oxide $M_2O$. The main catalyst generally contains a zeolite component, and by controlling the M content, it becomes possible to mitigate the effect of $M_2O$ on zeolite (poisoning on zeolite, etc.). Further, the content of M is more preferably 1.5 mass % or less, still more preferably 1.0 mass % or less, in terms of oxide.

<Physical Properties of Metal Trapping>

In X-ray diffraction analysis of the metal trapping according to embodiments of the present invention, no peak of silicate of the metal component is detected. Since no silicate of the metal component is formed, it is presumed that the metal component can sufficiently exhibit ability to trap heavy metals such as vanadium.

The attrition resistance of the metal trapping of the present invention can be measured based on the CCIC attrition index (CAI) described in Catalysts and Chemicals Giho Vol. 13, No. 1, P65, 1996. The attrition resistance index CAI of the metal trapping needs to be within a predetermined range herein. The reason is that in the case where the attrition resistance index CAI of the metal trapping is too small, the metal trapping performance may be poor, and in the case where the CAI is too large, the metal trapping is pulverized when added to the fluid catalytic cracking catalyst for use, which may cause equipment troubles or mixing of powder in a product. Although depending on the fluid catalytic cracking catalyst, the attrition resistance index CAI of the metal trapping is preferably in the range of 0.1 to 18. The attrition resistance index CAI of the metal trapping is more preferably in the range of 0.2 to 10, still more preferably in the range of 0.2 to 5.

The metal trapping of the present invention has an average particle size preferably in the range of 40 to 100 μm. In the particle size evaluation, measurement was performed by the dry micromesh sieve method to determine the value at 50 mass % (D50) as average particle size. In the case where the average particle size is excessively less than 40 μm, the metal trapping efficiency may be reduced, while in the case where the size is excessively more than 100 μm, the attrition resistance and strength of the metal trapping may be reduced. Further, it is more preferable that the average particle size of the metal trapping be in the range of 50 to 90 μm.

It is preferable that the metal trapping of the present invention have a specific surface area (SA) measured by the BET method in the range of 3 to 200 $m^2/g$. In the case where the specific surface area of the metal trapping is excessively less than 3 $m^2/g$, the compound easily aggregates, and the metal trapping efficiency decreases. On the other hand, in the case where the specific surface area is excessively more than 200 $m^2/g$, the strength as metal trapping decreases and the shape retention as metal trapping may be deteriorated. It is more preferable that the specific surface area of the metal trapping be in the range of 30 to 190 $m^2/g$.

It is preferable that the pore volume (PV) of the metal trapping of the present invention be in the range of 0.05 to 0.50 ml/g in the measurement by pore filling with water. In the case where the pore volume is excessively less than 0.05 ml/g, the metal trapping efficiency decreases, while in the case where the volume is excessively more than 0.50 ml/g, the strength may not be obtained as a catalyst. Further, the pore volume of the metal trapping is more preferably in the range of 0.05 to 0.45 ml/g, still more preferably in the range of 0.05 to 0.40 ml/g. Incidentally, the pore volume represents the volume of pores having a pore diameter of 41 Å (4.1 nm) or more.

It is preferable that the bulk density (ABD) of the metal trapping of the present invention be 0.70 g/ml or more. In measurement of the bulk density, the weight of the metal trapping is measured using a 25-ml cylinder so as to calculate the bulk density based on the weight per unit volume. In the case where the bulk density is less than 0.70 g/ml, due to insufficient attrition resistance, pulverization easily occurs in use as fluid catalyst, resulting in scatter of the catalyst, which may be unsuitable for practical use. Incidentally, the upper limit of the bulk density is a density determined by the composition.

[Regarding Production Method of Metal Trapping]

As an example, a production method of the metal trapping according to embodiments of the present invention comprising:

(1) a first step of obtaining a mixed slurry of silicon oxide (silica-based)—alumina component;

(2) a second step of obtaining a metal trapping precursor by adding a first metal component, and optionally a second metal component, to the mixed slurry, and (3) a third step of obtaining a metal trapping by drying and calcining the metal trapping precursor.

Hereinafter, each of the steps will be described.

<First Step: Step of Obtaining Mixed Slurry of Silicon Oxide (Silica-Based)>

First, a mixed slurry of silicon oxide (silica-based) is prepared. In the silicon oxide (silica-based) slurry, for example, an aqueous solution of a silicate such as sodium silicate and potassium silicate, or a silica-based sol is used as a binder. The silica-based sol for use may be prepared by passing an aqueous solution of silicate pass through an ion exchange resin for removal of cations. The silica-based gel or sol obtained on this occasion includes silica-based fine particles made of silicon oxide, and the average particle size of the silica-based fine particles is preferably 4 nm or more. (The value is the minimum for presence of sol.) Further, the average particle size is preferably 100 nm or less, more preferably 80 nm or less, still more preferably 50 nm or less. The term "silica-based fine particles" as used herein is a general term for a slurry of silica hydrates or silicon oxide (silica-based) obtained by the method described above. To the silica-based fine particles, a precursor of oxide of Ti, in addition to silicon, may be included within the range of 1 to 20 mass % in terms of oxide as a total of oxides based on the silica-based fine particles in preparation of the silicon oxide (silica-based) binder.

Next, as an alumina component, for example, pseudo boehmite is dispersed in pure water to prepare a pseudo boehmite slurry, which is added to the silicon oxide (silica-based) to prepare a mixed slurry of silicon oxide (silica-based)-alumina component. As the alumina component, in addition to pseudo boehmite, aluminum hydroxide or basic aluminum chloride may be used. A clay mineral may be added in place of, or together with, the alumina component.

<Second Step: Step of Obtaining Metal Trapping Precursor by Mixing Mixed Slurry with Metal Component>

An aqueous solution obtained by dissolving a metal component or an aqueous solution obtained by simultaneously adding metal component compounds is mixed and stirred with the mixed slurry obtained in the first step to obtain a mixed slurry of the metal component.

The mixing conditions are as follows. The mixed slurry solution is heated to and maintained at 20 to 90° C., preferably 25 to 80° C. To the mixed slurry, an aqueous solution containing a metal component heated to the temperature of the slurry solution ±5° C., preferably ±2° C., more preferably ±1° C. is continuously added usually for 5 to 20 minutes, preferably 7 to 15 minutes, such that the pH is adjusted to 3.0 to 12.0, preferably 3.5 to 11.5, more preferably 4.0 to 11.5, to cause precipitation. As a result, a mixed slurry of metal component (metal trapping precursor) is obtained.

The metal component includes group 2 elements as a first metal component. In particular, it is preferable that both of Mg and Ca be included. As Mg and Ca, compounds such as oxalates, hydroxides and carbonates may be employed. Alternatively, oxides may be used.

Rare earth elements may be added to the metal component as a second metal component, and may be, for example, La or Ce, or both of La and Ce. As La and Ce, compounds such as oxalates, hydroxides and carbonates may be used, and it is preferable that salts of the same type be combined. Alternatively, oxides of the rare earth elements may be used.

The particle size of the raw material of the first or second metal component is preferably 100 µm or less, and in some cases, use after crushing treatment is preferred.

<Third Step: Step of Obtaining Metal Trapping by Drying and Calcining Metal Trapping Precursor>

The mixed slurry of metal component (metal trapping precursor) obtained in the second step is dried and/or calcined at a temperature range of 100 to 600° C., preferably 110 to 600° C., more preferably 400 to 600° C., for 0.5 to 10 hours, preferably 1 to 8 hours, so that the metal trapping according to embodiments of the present invention is produced.

Drying may be performed by a dryer or spray dryer. Spray drying is more practical. It is preferable that the spray drying be performed under the following conditions.

Specifically, a slurry storage tank of the spray dryer is filled with the mixed slurry obtained in the second step, and the slurry is sprayed into a drying chamber in which a gas (e.g., air) stream adjusted in the range of 120 to 450° C., for example, at 230° C., flows, so as to obtain spray-dried particles. Although the temperature of the gas stream is lowered by spray drying of the slurry, the temperature of the outlet of the drying chamber is maintained in the range of 50 to 300° C., for example, at 120° C. by using a heater or the like.

The dried particles may be pre-calcined before the following washing. The pre-calcination may be performed in a temperature range of about 200 to 500° C., within 0.5 to 5 hours. Pre-calcination can prevent the elution of the constituents and the collapse of the metal trapping in a later-stage washing.

It is preferable that the dried particles be washed to remove by-products. In the washing treatment, specifically, the content of an alkali metal M in the metal trapping of the present invention can be reduced by washing with warm water (40 to 80° C.) at a solid-liquid ratio of 1:3 to 1:50, for a stirring time of about 3 to 30 minutes. The content of M in the metal trapping of the present invention is preferably 2.0 mass % or less, more preferably 1.5 mass % or less, still more preferably 1.0 mass % or less, in terms of $M_2O$. By controlling the content of an alkali metal M, the effect of $M_2O$ on the zeolite contained in the main catalyst (poisoning on zeolite, etc.) can be alleviated. Examples of the alkali metal M include Na, Li, and K.

Further, in the calcination treatment, specifically, calcining the spray-dried particles is performed under air atmosphere adjusted in the range of 300 to 700° C., for example, at 600° C. In the case where the calcination temperature is excessively less than 300° C., the operability may be deteriorated due to residual water, and the dispersed state of the metal component is less likely to be uniform. In the case where the calcination temperature is excessively more than 700° C., the metal component may aggregate, or a silicate of the metal component is likely to be generated, which is not preferable.

In order to adjust the particle size of the metal trapping of the present invention, crushing treatment may be appropriately performed after calcination.

[Regarding Fluid Catalytic Cracking Catalyst]

The fluid catalytic cracking catalyst according to embodiments of the present invention (hereinafter referred to as "Catalyst") contains at least the metal trapping, a zeolite component, a binder component, and a clay mineral component. The catalytic cracking treatment using the catalyst is performed in a fixed bed reactor filled with the catalyst under hydrogen atmosphere at high temperature and high pressure conditions.

<Metal Trapping>

It is preferable that the Catalyst contain the metal trapping of the present invention in the range of 0.5 to 10 mass %. In the case where the content of the metal trapping is less than 0.5 mass %, the effects of trapping metal and suppressing poisoning on the catalyst may be insufficient. On the other hand, in the case where the content is more than 10 mass %, the zeolite ratio in the catalyst decreases, which adversely affects the catalytic activity, and the excess active metal component also causes bad influence on the activity, such as poisoning on the zeolite, which is not preferable.

<Binder Component>

It is preferable that the Catalyst contain a binder component in the range of 5 to 30 mass %. In the case where the content of the binder component is less than 5 mass %, the bulk density may be too low, or the attrition resistance may be insufficient. On the other hand, in the case where the content of the binder component is more than 30 mass %, the excess binder component may cause pore clogging or the like, resulting in insufficient activity. The content of the binder component is preferably in the range of 5 to 25 mass %, more preferably 10 to 25 mass %.

As the binder component used in the Catalyst, those containing silica or alumina as a main component (meaning that the main component is contained in an amount of 50 mass % or more) may be used. As the binder component, a silica-based binder such as silica sol or an aluminum compound binder such as basic aluminum chloride may be used. As the silica-based binder other than silica sol, colloidal silica of sodium type, lithium type, acid type, etc., may also be used. As the aluminum compound binder other than basic aluminum chloride, an aluminum diphosphate solution, particles such as gibbsite, bayerite, boehmite, bentonite, crystalline alumina, etc., dissolved in an acid solution, particles of a boehmite gel, amorphous gel dispersed in an aqueous solution, or an alumina sol may also be used. These may be used alone or as a mixture or composition of two or more of these compounds.

<Alumina Binder>

As an example of the binder used in the Catalyst, an alumina binder will be described in detail. As raw material of the alumina binder, for example, basic aluminum chloride ($[Al_2(OH)_nCl_{6-n}]_m$ (wherein $0<n<6$, $m \leq 10$)) may be used. Basic aluminum chloride decomposes at a relatively low temperature of about 200 to 450° C. in the presence of cations such as aluminum, sodium and potassium contained in zeolite or the like. As a result, it is presumed that a part of basic aluminum chloride is decomposed to form a site where a decomposed product such as aluminum hydroxide is present in the vicinity of zeolite. Further, by calcining decomposed basic aluminum chloride at a temperature in the range of 300 to 600° C., an alumina binder (alumina) is formed. On this occasion, it is presumed that when the decomposed product in the vicinity of zeolite is calcined to make an alumina binder, a relatively large number of mesopores having a pore size of 4 nm or more and 50 nm or less are formed to increase the specific surface area of the Catalyst. On the other hand, it has also been confirmed that formation of macropores having a pore size of more than 50 nm and 1000 nm or less, which causes decrease in attrition resistance, is suppressed.

In the Catalyst, the alumina binder is detected as alumina in a matrix component. The alumina binder is added for the purpose of constituting a part of the matrix component and binding zeolite with the matrix component.

<Zeolite>

The Catalyst contains a zeolite component (crystalline alumina silicate). The zeolite is not particularly limited as long as it has catalytic cracking activity for a hydrocarbon oil as raw oil in a catalytic cracking process, particularly in a fluid catalytic cracking process. Examples of the zeolite may include one or more selected from faujasite zeolite, ZSM zeolite, zeolite, mordenite zeolite, and natural zeolite. It is preferable that the Catalyst include USY-type (Ultra-Stable Y-Type), which is a synthetic faujasite zeolite.

It is preferable that the Catalyst invention contain a zeolite component in the range of 10 to 50 mass %. In the case where the zeolite component content is less than 10 mass %, the activity may be insufficient due to shortage of zeolite. On the other hand, in the case where the zeolite content is more than 50 mass %, excessive cracking occurs due to the too high activity, which may result in decrease of selectivity. Further, due to the resulting shortage of matrix content other than zeolite, the bulk density may be too low, or the attrition resistance may be insufficient, and in use as a fluid catalyst, the catalyst may be easily pulverized and scattered. The zeolite component content is preferably in the range of 15 to 45 mass %, more preferably 20 to 40 mass %.

<Clay Mineral Component>

As the clay mineral component, kaolin, halloysite, diatomite, acid clay, activated clay etc., are used, and preferably, kaolin is selected.

It is preferable that the Catalyst contain a clay mineral component in the range of 10 to 40 mass %. In the case where the clay mineral content is less than 10 mass %, deterioration in maintaining the pore structure and the catalyst shape is caused, and insufficient attrition resistance and fluidity are obtained. On the other hand, in the case where the clay mineral content is more than 40 mass %, the content of zeolite as main active component is reduced, so that the cracking activity may be insufficient in some cases. The content of the clay mineral component is preferably in the range of 15 to 40 mass %, more preferably 20 to 35 mass %.

<Additive>

To the fluid catalytic cracking catalyst of the present invention, other additives may be added in addition to the metal trapping, the zeolite component, the binder component and the clay mineral component described above. Examples of the additives include an active matrix component, an octane enhancer and a component for increasing light olefin components.

Examples of the active matrix component include substances having a solid acid such as activated alumina, silica-alumina, silica-magnesia, alumina-magnesia, and silica-magnesia-alumina.

The Catalyst may contain the active matrix component in the range of 1 to 30 mass %, preferably 5 to 25 mass %, more preferably 5 to 20 mass %. In the case where the content of the active matrix component is less than 1 mass %, the coarse resolution in the matrix cannot be sufficiently obtained, which has an adverse effect on the activity, and decrease in bulk density and deterioration of attrition resistance and fluidity are concerned. On the other hand, in the case where the content of the active matrix component is more than 30 mass %, the content of the zeolite as main active component is reduced, so that the cracking activity may be insufficient in some cases.

<Specific Surface Area (SA)>

It is preferable that the specific surface area (SA) of the Catalyst measured by the BET (Brunauer-Emmett-Teller) method be in the range of 30 to 320 $m^2/g$. In the case where the specific surface area is less than 30 $m^2/g$, the catalytic cracking reaction may not be able to proceed sufficiently in a short contact time in a fluid catalytic cracking process, etc. On the other hand, in the case where the specific surface area is more than 320 $m^2/g$, sufficient strength as a fluid catalytic cracking catalyst may not be obtained. More preferably, the specific surface area of the whole catalyst is in the range of 100 to 250 $m^2/g$.

<Average Particle Size of Metal Trapping and Catalyst>

The particle size distribution of each sample of the metal trapping and the fluid catalytic cracking catalyst of the present invention may be measured with a laser diffraction/scattering particle size distribution analyzer (LA-950V2) manufactured by Horiba, Ltd. Specifically, the sample is placed in a solvent (water), such that the light transmittance is in the range of 70 to 95%. The measurement is then performed at a circulation rate of 2.8 L/min, under ultrasonic treatment for 3 min, with a repetition number of 30. The median diameter (D50) is used as average particle size. The average particle size of the metal trapping and the fluid catalytic cracking catalyst of the present invention is preferably 40 to 100 μm, more preferably 50 to 90 μm.

<Pore Volume (PV)>

The metal trapping according to embodiments of the present invention has a pore volume (PV) of 0.05 to 0.50 ml/g, preferably 0.10 to 0.45 ml/g, in the entire pore size range, measured by pore filling with water. In the case of using as fluid catalyst, sufficient catalytic cracking activity may not be obtained with a pore volume of less than 0.05 ml/g. On the other hand, with a pore volume of more than 0.50 ml/g, the catalyst may have reduced catalyst strength.

<Bulk Density (ABD)>

In the method for measuring the bulk density (ABD) of the metal trapping of the present invention, the weight of the metal trapping is measured using a 25-ml cylinder, and the bulk density is calculated based on the weight per unit volume. It is preferable that the lower limit of the bulk density be 0.70 g/ml. In the case where the bulk density is less than 0.70 g/ml, the attrition resistance is insufficient, and in use as a fluid catalyst, the catalyst may be easily pulverized and scattered.

[Production Method of Fluid Catalytic Cracking Catalyst]

The fluid catalytic cracking catalyst according to embodiments of the present invention is obtained by preparing a slurry containing, for example, zeolite (crystalline alumina silicate), an alumina binder, a clay mineral component, the above-described additives, and the metal trapping according to embodiments of the present invention, spray drying the slurry, and calcining the powder obtained by spray drying in a muffle furnace, for example, at 400 to 600° C. for 0.5 to 10 hours.

EXAMPLES

Example 1

[MTR-11] Metal Trapping Using Water Glass (MgO: 50%, $CaCO_3$: 15% (in Terms of CaO))

To a diluted sodium hydroxide aqueous solution containing 0.28 mass % of $Na_2O$, 357.7 g of kaolin (solid content: 81 mass %) was added. The slurry was added to 937.5 g of water glass containing 24 mass % of $SiO_2$ (first step). Then, to the stirred mixture solution (25° C.), 3000 g of magnesium oxide slurry (25 mass % in terms of MgO, 25° C.) and 900 g of calcium carbonate slurry (25 mass % in terms of CaO, 25° C.) were added to form a precipitate, so that a raw material slurry was obtained (second step). Then, the dispersion treatment was performed using a homogenizer.

The raw material slurry made into droplets was spray-dried with a spray dryer having an inlet temperature of 210° C. and an outlet temperature of 130° C. to obtain spherical particles having an average particle size of 65 μm. The spray-dried particles were calcined in an electric furnace under air atmosphere at 250° C. for 1 hour to obtain calcined particles.

To 2000 g of pure water at 60° C., 200 g of the resulting calcining particles were added, and the mixture was stirred for 10 minutes. The stirred mixture was suction filtered, and the filtration residue was washed with 2000 g of pure water at 60° C. to obtain washed particles. The washed particles were dried at 120° C. for 8 hours and calcined at 600° C. for 2 hours to obtain a metal trapping MTR-11 (third step).

[MTR-12] Metal Trapping Using Water Glass (MgO: 50%, $CaCO_3$: 10% (in Terms of CaO))

A metal trapping MTR-12 was obtained in the same manner as in the preparation of MTR-11, except that the amount of kaolin was changed to 447.2 g and calcium carbonate slurry to 600 g.

[MTR-13] Metal Trapping Using Water Glass (MgO: 30%, $CaCO_3$: 10% (in Terms of CaO))

A metal trapping MTR-13 was obtained in the same manner as in the preparation of MTR-11, except that the amount of kaolin was changed to 740.7 g, water glass (24 mass % in terms of $SiO_2$) to 1250 g, magnesium oxide slurry to 1800 g, and calcium carbonate slurry to 600 g.

[MTR-14] Metal Trapping Using Water Glass (MgO: 50%, $CaCO_3$: 10% (in Terms of CaO), $La_2O_3$: 5%)

A metal trapping MTR-14 was obtained in the same manner as in the preparation of MTR-11, except that the amount of kaolin was changed to 364.5 g, magnesium oxide slurry to 3000 g, calcium carbonate slurry to 600 g, and lanthanum carbonate slurry to 250 g (30 mass % in terms of $La_2O_3$).

[MTR-1a] Metal Trapping Using No Clay Mineral (MgO: 70%, $CaCO_3$: 20% (in Terms of CaO))

A metal trapping MTR-1a was obtained in the same manner as in the preparation of MTR-11 except that the raw material slurry was changed by adding 4200 g of magnesium oxide slurry (25 mass % in terms of MgO) and 1200 g of calcium carbonate slurry (25 mass % in terms of CaO) to 625 g of water glass containing 24 mass % of $SiO_2$.

[MTR-1b] Metal Trapping with Insufficient Amount of Metal Component (MgO: 10%, $CaCO_3$: 5% (in Terms of CaO))

A metal trapping MTR-1b was obtained in the same manner as in the preparation of MTR-11 except that the amount of kaolin was changed to 1175.4 g, water glass to 1250 g, magnesium oxide slurry to 600 g, and calcium carbonate slurry to 300 g.

[MTR-1c] Metal Trapping Containing $Na_2O$ in a Specified Amount or More.

A metal trapping MTR-1c containing $Na_2O$ in a specified amount or more was obtained through the spray-drying treatment in the same manner as in the preparation of MTR-1 except that the amount of kaolin was changed to 477.0 g, water glass to 1666.7 g, magnesium oxide slurry to 4000 g, and calcium carbonate slurry to 800 g, and through direct calcination of the spray-dried particles at 600° C. for 2 hours, without the subsequent calcination at 250° C. and washing.

[MTR-1d] Metal Trapping MTR-1d Containing $La_2O_3$ in a Specified Amount or More A metal trapping MTR-1d was obtained in the same manner as in the preparation of MTR-1, except that the amount of kaolin was changed to 798.5 g, water glass to 937.5 g, magnesium oxide slurry to 1200 g, calcium carbonate slurry to 600 g, and lanthanum carbonate slurry to 500 g (30 mass % in terms of $La_2O_3$).

[Results of Physical Property Analysis of Metal Trapping]

Figure 2:
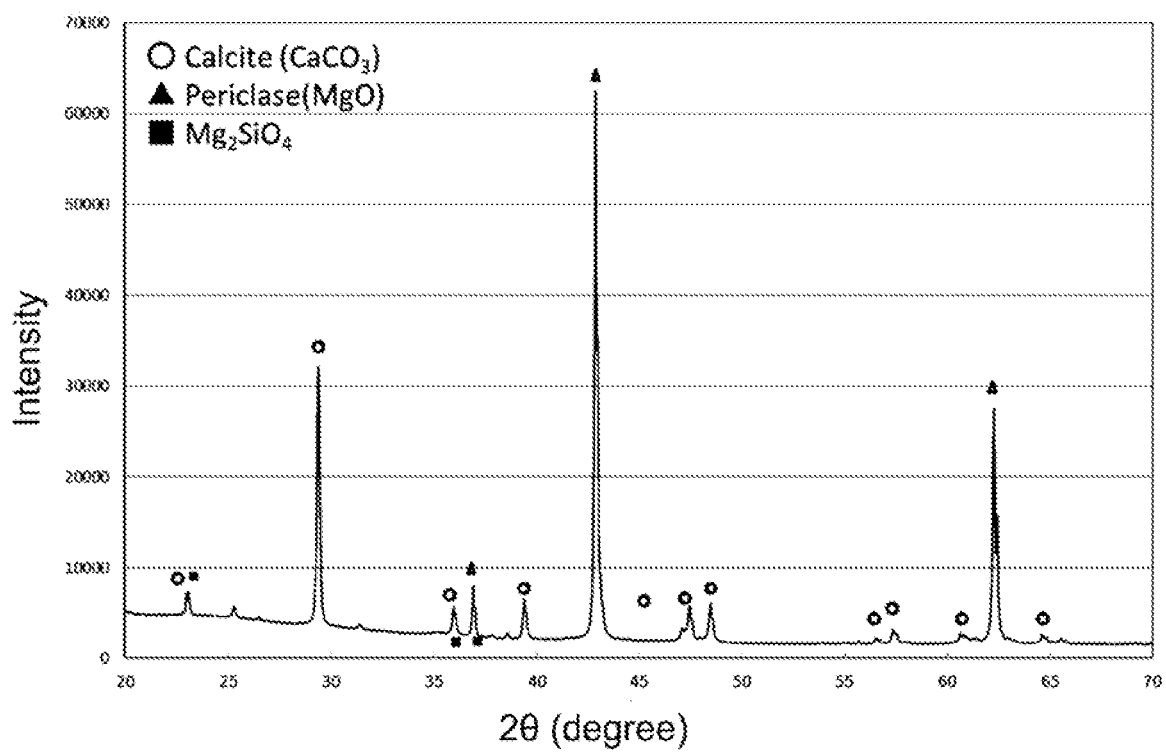
FIG. 2 is a graph showing an X-ray diffraction intensity of a metal trapping MTR-1b calcined at 600° C. in a Comparative Example.

The component composition of each of the metal trappings prepared as described above and the performance of the products calcined at the 600° C. are summarized in Table 1. As the performance, the bulk density (ABD), the pore volume (PV), the specific surface area (SA), the attrition resistance (CAI), and the presence or absence of silicate identified by X-ray diffraction are described. In FIG. 1, a graph of X-ray diffraction intensity of a product of the metal trapping MTR-11 calcined at 600° C., prepared in Example 1 as an embodiment of the present invention, is shown. The resulting X-ray diffraction intensity peaks are only for calcium carbonate ($CaCO_3$) and magnesia (MgO), and no peaks for silicates of Ca and Mg appeared. In the X-ray diffraction results of MTR-12, 13 and 14, no peaks of silicates appeared as in the result of MTR-11. In FIG. 2, a graph of X-ray diffraction intensity of a product of MTR-1b calcined at 600° C. is shown. In the resulting X-ray diffraction intensity peaks, a peak of silicate ($Mg_2SiO_4$) appeared. In the X-ray diffraction results of MTR-1a, 1c and 1d also, a clear diffraction intensity peak of magnesium silicate or calcium silicate appeared. The component compositions of MTR-11 to 14 were within a suitable range, and all of the bulk density (ABD), the pore volume (PV), the specific surface area (SA) and the attrition resistance (CAI) were within suitable ranges as a metal trapping. On the other hand, MTR-1a had a bulk density that was less than the preferred range, MTR-1b had a pore volume and a specific surface area that were less than the preferred ranges, and MTR-1d had a specific surface area that was less than the preferred range. Further, MTR-1c had a $Na_2O$ content that was more than the preferred range.

rare earth element, having a specific surface area of 276 $m^2$/g and a pore volume of 0.36 ml/g.

<Preparation of Fluid Catalytic Cracking Catalyst Composition for Blending with Metal Trapping>

First, 547.5 g of an aqueous basic aluminum chloride solution at a concentration of 22.83 mass % in terms of alumina and 593.2 g of pure water were mixed and stirred. Next, to the mixed solution, 833.3 g of zeolite slurry at a concentration of 30 mass % was added, and as additives, 222.5 g of kaolin (solid content: 81 mass %) as clay mineral component, 453.9 g of activated alumina (solid content: 77 mass %) as active matrix component, and 207.0 g of an aqueous lanthanum chloride solution having an $RE_2O_3$ concentration of 21.74 mass % were sequentially added to obtain a raw material slurry. Dispersion treatment was performed using a homogenizer, and the resulting raw material slurry had a solid content concentration of 35% and a pH of 4.9.

The raw material slurry made into droplets was spray-dried with a spray dryer having an inlet temperature of 250° C. and an outlet temperature of 150° C. to obtain spherical particles having an average particle size of 65 μm. The spray-dried particles were calcined in an electric furnace under air atmosphere at 450° C. for 1 hour to obtain calcined particles.

To 1500 g of pure water at 60° C., 300 g of the resulting calcined particles were added, and the mixture was stirred for 5 minutes. The pH of the slurry was 3.6. After suction

TABLE 1

| Sample No. | Binder Type of silicon oxide | Component composition in terms of oxide [mass %] | | | | | | | Performance of product calcined at 600° C. | | | | Presence or absence of silicate | Remarks |
|---|---|---|---|---|---|---|---|---|---|---|---|---|---|---|
| | | $SiO_2$ | $Al_2O_3$ | MgO | CaO | $Na_2O$ | $RE_2O_3$ | Others | Bulk density ABD [g/ml] | Pore volume PV [ml/g] | Specific surface area SA [$m^2$/g] | CAI | | |
| MTR-11 | Water glass | 15 | — | 49 | 15 | 1.90 | — | Kaolin: 20 | 0.76 | 0.23 | 31 | 15.0 | Absent | Invention Example |
| MTR-12 | Water glass | 15 | — | 49 | 10 | 1.62 | — | Kaolin: 25 | 0.82 | 0.18 | 26 | 10.9 | Absent | Invention Example |
| MTR-13 | Water glass | 20 | — | 29 | 10 | 1.82 | — | Kaolin: 39 | 0.90 | 0.05 | 10 | 6.9 | Absent | Invention Example |
| MTR-14 | Water glass | 15 | — | 49 | 10 | 1.70 | 5 | Kaolin: 20 | 0.85 | 0.17 | 24 | 12.0 | Absent | Invention Example |
| MTR-1a | Water glass | 10 | — | 69 | 20 | 2.12 | — | — | 0.65 | 0.31 | 45 | Unmeasurable | Present | Comparative Example |
| MTR-1b | Water glass | 20 | — | 10 | 5 | 1.53 | — | Kaolin: 64 | 0.98 | 0.01 | 2.8 | 3.0 | Present | Comparative Example |
| MTR-1c | Water glass | 19 | — | 47 | 9 | 6.78 | — | Kaolin: 18 | 0.88 | 0.06 | 15 | Unmeasurable | Present | Comparative example |
| MTR-1d | Water glass | 15 | — | 20 | 10 | 1.88 | 10 | Kaolin: 54 | 0.93 | 0.03 | 8 | 4.0 | Present | Comparative example |

—: Not applicable

Example 2

[Performance Evaluation of Fluid Catalytic Cracking Catalyst Containing Metal Trapping]

In order to check the effect of addition of a metal trapping, each of the metal trappings MTR-11, 12 and 1c produced in Example 1 was blended in a mass ratio of 5% based on the fluid catalytic cracking catalyst composition using an alumina binder to prepare a fluid catalytic cracking catalyst and performance evaluation was performed. The fluid catalytic cracking catalyst used contained 12.5 mass % of an alumina binder, 25 mass % of zeolite, 35 mass % of activated alumina, 18 mass % of kaolin, and 4.5 mass % of $RE_2O_3$ as filtration, the filtration residue was washed with 1500 g of pure water at 60° C. to obtain a washed particle cake (1).

After 1500 g of pure water at 60° C. and the washed particle cake (1) were mixed and resuspended, 30.5 g of ammonium sulfate was added, and the mixture was stirred for 20 minutes. After suction filtration, the filtration residue was washed with 1500 g of pure water at 60° C. to obtain a washed particle cake (1').

After 1500 g of pure water at 60° C. and the washed particle cake (1') were mixed and resuspended, 29 g of a lanthanum chloride aqueous solution at a concentration of 22 mass % as polyvalent cation source for ion exchange of zeolite was added thereto, and the mixture was stirred for 20 minutes. After suction filtration, the filtration residue particles were washed with 1500 g of pure water at 60° C. After repetition of the operation twice, the filtration residue particles were dried at 135° C. for 2 hours to obtain a fluid catalytic cracking catalyst composition.

[Performance Evaluation Test of Catalyst]

A fluid catalytic cracking catalyst was prepared by blending each metal trapping with the catalyst composition obtained as described above, and a performance evaluation test of the catalyst was performed using the same crude oil under the same reaction conditions based on ACE-MAT (Advanced Cracking Evaluation-Micro Activity Test). The results of the performance evaluation test of each catalyst are shown in Table 2. The conversion rate is shown in the case where the mass ratio (C/O) of catalyst/oil throughput is 3.75, and each yield is shown at the same conversion rate and expressed by percentage of the mass of each component in the produced oil based on the mass of the raw oil.

However, before the performance evaluation tests, 1000 mass ppm of nickel (mass of nickel divided by mass of catalyst) and 2000 mass ppm of vanadium (mass of vanadium divided by mass of catalyst) were impregnated with each catalyst, and a pseudo equilibration treatment was then performed by steaming. Specifically, after each catalyst was calcined at 600° C. for 2 hours, a predetermined amount of toluene solution of nickel naphthenate and vanadium naphthenate was absorbed therein. Subsequently, the catalyst was dried at 110° C., and then calcined at 600° C. for 1.5 hours. Subsequently, the catalyst was subject to steam treatment at 780° C. for 13 hours.

Operating conditions in the performance evaluation test are as follows.

Raw oil: Desulfurized atmospheric residual oil (DSAR)+ Desulfurized vacuum gas oil (DSVGO) (50+50)
Mass ratio of catalyst/oil throughput (C/O): 3.75, 5.0
Reaction temperature: 520° C.
1) Conversion rate=100−(LCO+HCO+CLO) (mass %)
2) Measurement was performed at a mass ratio catalyst/oil of 3.75 or 5.0, and each yield at the same conversion rate (=73 mass %) was determined by interpolation.
3) Boiling point range of gasoline: 30 to 216° C. (gasoline)
4) Boiling point range of LCO: 216 to 343° C. (LCO: light cycle oil)
5) Boiling point range of HCO and CLO: 343° C.+(HCO: heavy cycle oil, CLO: clarified oil)
6) LPG (liquefied petroleum gas)
7) Dry gas: methane, ethane and ethylene

[Evaluation Results of Catalyst Activity]

According to the evaluation results of catalyst activity (Table 2), in the performance evaluation results of the catalysts (invention example) containing 5% of the metal trapping MTR-11 or 12 prepared in Example 1 (comparison at the same C/O=3.75), the conversion rate increased in comparison with the catalyst of 100% of a matrix catalyst and containing no metal trapping (test No. 11: reference), so that it is apparent that the yield of $H_2$, dry gas and coke decreases, and the yield of gasoline and LPG increases. The catalyst containing the metal trapping MTR-1c having a silicate was unsuitable as a catalyst due to particularly low improvement in the selectivity of gasoline and coke and fierce pulverization in comparison with the catalysts containing MTR-11 or MTR-12 in the invention examples.

Example 3

[MTR-21] Metal Trapping Using Silica Sol Having an Average Particle Size of 4 to 5 nm (MgO: 50%, $CaCO_3$: 10% (in Terms of CaO))

A kaolin slurry having a solid content concentration of 25 mass % (225 g in terms of solid content) was prepared by diluting 273.4 g of kaolin having a solid content concentration of 82.31 mass % with pure water. The kaolin slurry was added to 1811.6 g of silica sol slurry (SI-550, manufactured by JGC Catalysts and Chemicals Ltd.) having an $SiO_2$ concentration of 20.7 mass % (375 g in terms of $SiO_2$) (first step). Next, to the stirred mixture solution (25° C.), 3750 g of magnesium oxide slurry (20 mass % in terms of MgO, 25° C.) and 750 g of calcium carbonate slurry (20 mass % in terms of CaO, 25° C.) were added to obtain a raw material slurry (second step).

The raw material slurry made into droplets was spray-dried with a spray dryer having an inlet temperature of 180° C. and an outlet temperature of 90° C. to obtain spherical particles having an average particle size of 65 μm. The spray-dried particles were calcined in an electric furnace under air atmosphere at 600° C. for 2 hours to obtain MTR-21 (third step). On this occasion, the alkali metal content was 0.8 mass % in terms of $Na_2O$, the specific surface area was 63 $m^2/g$, and the pore volume was 0.33 ml/g.

[MTR-22] Metal Trapping Using Silica Sol Having an Average Particle Size of 4 to 5 nm (MgO: 45%, $CaCO_3$: 15% (in Terms of CaO))

MTR-22 was obtained in the same manner as in the preparation of MTR-21, except that the amount of magnesium oxide slurry was changed to 3375 g (20 mass %, 675

TABLE 2

| Test No. | 11 | 12 | 13 | 14 |
|---|---|---|---|---|
| Metal trapping | None | MTR-11 | MTR-12 | MTR-1c |
| Addition amount[mass %] | 0 | 5 | 5 | 5 |
| C/O [—] | 3.75 | 3.75 | 3.75 | 3.75 |
| Conversion rate[mass %] | 75.46 | 76.66 | 76.34 | 75.21 |
| Yield [mass %] $H_2$ | 0.82 | 0.47 | 0.53 | 0.82 |
| Dry Gas | 2.92 | 2.37 | 2.43 | 2.84 |
| LPG | 14.55 | 16.07 | 15.55 | 14.24 |
| Gasoline | 49.87 | 51.79 | 51.62 | 49.62 |
| LCO | 17.26 | 16.40 | 16.80 | 17.53 |
| HCO | 7.28 | 6.94 | 6.86 | 7.26 |
| Coke | 8.12 | 6.43 | 6.74 | 8.51 |
| Pulverization of catalyst | Absent | Absent | Absent | Present |
| Remarks | Comparative Example (reference) | Invention Example | Invention Example | Comparative Example | g in terms of MgO) and the calcium carbonate slurry to 1125 g (20 mass %, 225 g in terms of CaO).

[MTR-23] Metal Trapping Using Silica Sol Having an Average Particle Size of 4 to 5 nm (MgO: 30%, $CaCO_3$: 10% (in Terms of CaO))

MTR-23 was obtained in the same manner as in the preparation of MTR-21, except that the amount of kaolin slurry was changed to 2100 g (525 g in terms of solid content), the magnesium oxide slurry to 2250 g (20 mass %, 450 g in terms of MgO), and the calcium carbonate slurry to 750 g (20 mass %, 150 g in terms of CaO).

[MTR-24] Metal Trapping Using Silica Alumina Sol (MgO: 50%, $CaCO_3$: 10% (in Terms of CaO))

MTR-24 was obtained in the same manner as in the preparation of MTR-21, except that 1820.4 g of silica sol containing 1.6 mass % of $Al_2O_3$(SN-sol, manufactured by JGC Catalysts and Chemicals Ltd.) (345 g in terms of $SiO_2$) was used.

[MTR-25] Metal Trapping Using Silica Sol Having an Average Particle Size of 4 to 5 nm (MgO: 50%, $CaCO_3$: 10% (in Terms of CaO), $La_2O_3$: 5%)

MTR-25 was obtained in the same manner as in the preparation of MTR-21, except that the amount of kaolin slurry was changed to 600 g (150 g in terms of solid content) and the lanthanum oxide to 76.5 g (75 g in terms of $La_2O_3$).

[MTR-26] Metal Trapping Using Silica Sol Having an Average Particle Size of about 30 nm (MgO: 30%, $CaCO_3$: 10% (in Terms of CaO))

MTR-26 was obtained in the same manner as in the case of MTR-23, except that 776.4 g of silica sol (SI-50, manufactured by JGC Catalysts and Chemicals Ltd.) (375 g in terms of $SiO_2$) was used.

[MTR-2a] Metal Trapping Using Water Glass as Binder (MgO: 50%, $CaCO_3$: 10% (in Terms of CaO))

To a diluted sodium hydroxide aqueous solution containing 0.28 mass % of $Na_2O$, 364.5 g of kaolin (solid content: 82.31 mass %) was added. The slurry was added to 1250 g of water glass containing 24 mass % of $SiO_2$ (first step). Then, to the stirred mixture solution (25° C.), 3000 g of magnesium oxide slurry (25 mass % in terms of MgO, 25° C.) and 900 g of calcium carbonate slurry (25 mass % in terms of CaO, 25° C.) were added to form a precipitate, so that a raw material slurry was obtained (second step). Then, the dispersion treatment was performed using a homogenizer.

The raw material slurry made into droplets was spray-dried with a spray dryer having an inlet temperature of 210° C. and an outlet temperature of 130° C. to obtain spherical particles having an average particle size of 65 μm. The spray-dried particles were calcined in an electric furnace under air atmosphere at 250° C. for 1 hour to obtain calcined particles.

To 2000 g of pure water at 60° C., 200 g of the resulting calcined particles were added, and the mixture was stirred for 10 minutes. The stirred mixture was suction filtered, and the filtration residue was washed with 2000 g of pure water at 60° C. to obtain washed particles. The washed particles were dried at 120° C. for 8 hours and calcined at 600° C. for 2 hours to obtain a metal trapping MTR-2a (third step). On this occasion, the alkali metal content was 2.34 mass % in terms of $Na_2O$, the specific surface area was 12 $m^2/g$, and the pore volume was 0.1 ml/g.

[MTR-2b] Metal Trapping Using Silica Sol Having an Average Particle Size of 4 to 5 nm (MgO: 70%, $CaCO_3$: 10% (in Terms of CaO))

MTR-2b was obtained in the same manner as in the preparation of MTR-21, except that no kaolin was added and the amount of silica sol slurry (SI-550, manufactured by JGC Catalysts and Chemicals Ltd.) was changed to 1451.4 g (300 g in terms of $SiO_2$), the magnesium oxide slurry to 5250 g (20 mass %, 1050 g in terms of MgO), and the calcium carbonate slurry to 750 g (20 mass %, 150 g in terms of CaO).

[MTR-2c] Metal Trapping Using Silica Sol Having an Average Particle Size of 4 to 5 nm (MgO: 10%, $CaCO_3$: 20% (in Terms of CaO))

MTR-2c was obtained in the same manner as in the preparation of MTR-21, except that the amount of kaolin slurry was changed to 2400 g (600 g in terms of solid content), silica sol slurry (SI-550, manufactured by JGC Catalysts and Chemicals Ltd., to 2177.1 g (450 g in terms of $SiO_2$), magnesium oxide slurry to 750 g (20 mass %, 150 g in terms of MgO), and calcium carbonate slurry to 1500 g (20 mass %, 300 g in terms of CaO).

[MTR-2d] Metal Trapping Using Silica Sol Having an Average Particle Size of 4 to 5 nm (MgO: 40%, $CaCO_3$: 30% (in Terms of CaO))

MTR-2d was obtained in the same manner as in the preparation of MTR-21, except that amount of the kaolin slurry was changed to 600 g (150 g in terms of solid content), the silica sol slurry (SI-550, manufactured by JGC Catalysts and Chemicals Ltd.) to 1451.4 g (300 g in terms of $SiO_2$), the magnesium oxide slurry to 3000 g (20 mass %, 600 g in terms of MgO), and the calcium carbonate slurry to 2250 g (20 mass %, 450 g in terms of CaO).

[MTR-2e] Metal Trapping Using Silica Sol Having an Average Particle Size of 4 to 5 nm (MgO: 50%)

MTR-2e was obtained in the same manner as in the preparation of MTR-21, except that the amount of kaolin slurry was changed to 1500 g (375 g in terms of solid content) and the magnesium oxide slurry to 3750 g (20 mass %, 750 g in terms of MgO).

[MTR-2f] Metal Trapping Using Silica Sol Having an Average Particle Size of about 160 nm (MgO: 50%, $CaCO_3$: 10% (in Terms of CaO))

MTR-2f was obtained in the same manner as in the case of MTR-21, except that 1623.4 g of silica sol (SPHERICA SLURRY 160) was used (375 g in terms of solid content).

Various compositions and performances of the metal trappings MTR-21 to MTR-26 and MTR-2a to MTR-2f prepared as described above were measured in the same manner as in Example 1, and sample conditions and performance measurement results are shown in Table 3. As a result of identification of the presence or absence of silicates for each sample by X-ray diffraction, silicates of Mg and Ca were found only in MTR-2a which used water glass.

TABLE 3

| | Binder component | | | | | | | | | Performance of product calcined at 600° C. | | | | |
|---|---|---|---|---|---|---|---|---|---|---|---|---|---|---|
| | | Average particle | Component composition in terms of oxide [mass %] | | | | | | | Bulk density | Pore volume | Specific surface area | | |
| Sample No. | Type of silica oxide * | size D[nm] | $SiO_2$ | $Al_2O_3$ | MgO | CaO | $Na_2O$ | $RE_2O_3$ | Remarks | ABD [g/ml] | PV [ml/g] | SA [m²/g] | CAI | Remarks |
| MTR-21 | SI-550 | 4 to 5 | 25 | — | 50 | 10 | 0.80 | — | Kaolin: 15 | 0.77 | 0.33 | 63 | 6.8 | Invention Example |
| MTR-22 | SI-550 | 4 to 5 | 25 | — | 45 | 15 | 0.91 | — | Kaolin: 15 | 0.73 | 0.34 | 58 | 5.3 | Invention Example |
| MTR-23 | SI-550 | 4 to 5 | 25 | — | 30 | 10 | 0.88 | — | Kaolin: 35 | 0.80 | 0.15 | 39 | 4.1 | Invention Example |
| MTR-24 | SN(SiO₂/Al₂O₃)** | 14 | 23 | 2 | 50 | 10 | 0.11 | — | Kaolin: 15 | 0.70 | 0.36 | 56 | 6.5 | Invention Example |
| MTR-25 | SI-550 | 4 to 5 | 25 | — | 50 | 10 | 0.89 | 5 | Kaolin: 10 | 0.76 | 0.34 | 65 | 6.9 | Invention Example |
| MTR-26 | SI-50 | 30 | 25 | — | 30 | 10 | 0.92 | — | Kaolin: 35 | 0.81 | 0.16 | 28 | 9.3 | Invention Example |
| MTR-2a | Water glass | — | 24 | — | 49 | 10 | 2.34 | — | Kaolin: 20 | 0.88 | 0.10 | 12 | 21.5 | Comparative Example |
| MTR-2b | SI-550 | 4 to 5 | 20 | — | 70 | 10 | 0.54 | — | — | 0.61 | 0.51 | 65 | Unmeasurable | Comparative Example |
| MTR-2c | SI-550 | 4 to 5 | 30 | — | 10 | 20 | 1.09 | — | Kaolin: 39 | 0.90 | 0.08 | 25 | 5.1 | Invention Example |
| MTR-2d | SI-550 | 4 to 5 | 20 | — | 39 | 30 | 1.01 | — | Kaolin: 10 | 0.64 | 0.44 | 60 | Unmeasurable | Comparative Example |
| MTR-2e | SI-550 | 4 to 5 | 25 | — | 49 | 0 | 0.98 | — | Kaolin: 25 | 0.80 | 0.24 | 59 | 6.7 | Invention Example |
| MTR-2f | SPHERICA SLURRY 160 | 160 | 25 | — | 50 | 10 | 0.05 | — | Kaolin: 15 | 0.61 | 0.45 | 18 | Unmeasurable | Comparative Example |

\* The types of silicon oxide other than water glass represent variety of silicon oxide-based sols.
\*\*In the metal trapping, $Al_2O_3$ is contained by 2 mass %.
—: Not applicable

[Evaluation Result of Attrition]

As shown in Table 3, the invention examples MTR-21 to 26, 2c and 2e had sufficient attrition resistance. In contrast, MTR-2a, 2b, 2d and 2f had excessively high attrition resistance index CAI or unmeasurable CAI, having insufficient strength when blended with a fluid catalyst.

Example 4

[Performance Evaluation of Fluid Catalytic Cracking Catalyst Containing Metal Trapping]

In order to check the effect of addition of the metal trapping according to embodiments of the present invention, 5% of each of the metal trappings MTR-21, 22, 2a, 2c and 2e prepared in Example 3 was blended with a fluid catalytic cracking catalyst composition using an alumina binder, so that a fluid catalytic cracking catalyst composition was prepared and performance evaluation was performed. The fluid catalytic cracking catalyst used contains 12.5 mass % of an alumina binder, 25 mass % of zeolite, 35 mass % of activated alumina, 18 mass % of kaolin, and 4.5 mass % of rare earth elements in terms of $RE_2O_3$, having a specific surface area of 276 m²/g and a pore volume of 0.36 ml/g.

<Preparation of Fluid Catalytic Cracking Catalyst Composition for Blending with Metal Trapping>

First, 547.5 g of an aqueous basic aluminum chloride solution having a concentration of 22.83 mass % in terms of alumina and 593.2 g of pure water were mixed and stirred. Next, to the mixture solution, 833.3 g of a zeolite slurry having a concentration of 30 mass % was added, and as additives, 222.5 g of kaolin as clay mineral component (solid content: 81 mass %), 453.9 g of activated alumina as active matrix component (solid content: 77 mass %), and 207.0 g of an aqueous lanthanum chloride solution having a concentration of 21.74 mass % in terms of $RE_2O_3$ were sequentially added to obtain a raw material slurry. Dispersion treatment was performed using a homogenizer, and the resulting raw material slurry had a solid content concentration of 35% and a pH of 4.9.

The raw material slurry made into droplets was spray-dried with a spray dryer having an inlet temperature of 250° C. and an outlet temperature of 150° C. to obtain spherical particles having an average particle size of 65 μm. The spray-dried particles were calcined in an electric furnace under air atmosphere at 450° C. for 1 hour to obtain calcined particles.

To 1500 g of pure water at 60° C., 300 g of the resulting calcined particles were added, and the mixture was stirred for 5 minutes. The pH of the slurry was 3.6. After suction filtration, the filtration residue was washed with 1500 g of pure water at 60° C. to obtain a washed particle cake (1).

After 1500 g of pure water at 60° C. and the washed particle cake (1) were mixed and resuspended, 30.5 g of ammonium sulfate was added, and the mixture was stirred for 20 minutes. After suction filtration, the filtration residue was washed with 1500 g of pure water at 60° C. to obtain a washed particle cake (1').

After 1500 g of pure water at 60° C. and the washed particle cake (1') were mixed and resuspended, 29 g of a lanthanum chloride aqueous solution at a concentration of 22 mass % as polyvalent cation source for ion exchange of zeolite was added thereto, and the mixture was stirred for 20 minutes. After suction filtration, the filtration residue particles were washed with 1500 g of pure water at 60° C. After repetition of the operation twice, the filtration residue particles were dried at 135° C. for 2 hours to obtain a fluid catalytic cracking catalyst composition.

[Performance Evaluation Test of Catalyst]

A fluid catalytic cracking catalyst was prepared by blending each metal trapping with the catalyst composition obtained as described above, and a performance evaluation test of the catalyst was performed using the same crude oil under the same reaction conditions based on ACE-MAT (Advanced Cracking Evaluation-Micro Activity Test). The results of the performance evaluation test of each catalyst are shown in Table 4. Each yield is shown at the same conversion rate, that is, 77 mass % here, and expressed by percentage of the mass of each component in the produced oil based on the mass of the raw oil.

However, before the performance evaluation tests, 1000 mass ppm of nickel (mass of nickel divided by mass of catalyst) and 2000 mass ppm of vanadium (mass of vanadium divided by mass of catalyst) were deposited on the surface of each catalyst, and a pseudo equilibration treatment was then performed by steaming. Specifically, after each catalyst was calcined at 600° C. for 2 hours, a predetermined amount of toluene solution of nickel naphthenate and vanadium naphthenate was absorbed therein. Subsequently, the catalyst was dried at 110° C., and then calcined at 600° C. for 1.5 hours. Subsequently, the catalyst was subject to steam treatment at 780° C. for 13 hours.

Operating conditions in the performance evaluation test are as follows.

Raw oil: Desulfurized atmospheric residual oil (DSAR)+ Desulfurized vacuum gas oil (DSVGO) (50+50)
Mass ratio of catalyst/oil throughput (C/O): 3.75, 5.0
Reaction temperature: 520° C.
1) Conversion rate=100−(LCO+HCO+CLO) (mass %)
2) Measurement was performed at a mass ratio catalyst/oil of 3.75 or 5.0, and each yield at the same conversion rate (=77 mass %) was determined by interpolation.
3) Boiling point range of gasoline: 30 to 216° C. (gasoline)
4) Boiling point range of LCO: 216 to 343° C. (LCO: light cycle oil)
5) Boiling point range of HCO and CLO: 343° C.+(HCO: heavy cycle oil, CLO: clarified oil)
6) LPG (liquefied petroleum gas)
7) Dry Gas: methane, ethane and ethylene

[Evaluation Results of Catalyst Activity]

According to the evaluation results of catalyst activity, in the performance evaluation results of the catalysts containing 5% of the metal trapping MTR-21, 22, 2a, 2c or 2e prepared in Example 3 (yield at the same conversion rate (77%)), it is apparent that the yield of $H_2$, dry gas and coke decreases, and the yield of gasoline increases in comparison with 100% of a matrix catalyst containing no metal trapping (test No. 21: reference). Further, it is apparent that the catalyst containing the metal trapping MTR-21 or 22 having a composition in a suitable range has particularly higher improvement in the yield of coke, dry gas and gasoline in comparison with the catalysts containing MTR-2a, 2c or 2e. Incidentally, the catalyst containing the metal trapping MTR-2a was unable to be used in practice due to high pulverization ratio.

Example 5

[MTR-31] Metal Trapping Using Silica Fine Particles Having an Average Particle Size of 4 to 5 nm and Pseudo Boehmite (MgO: 50%, $CaCO_3$: 10% (in Terms of CaO))

A pseudo boehmite slurry having a solid content concentration of 25 mass % (150 g in terms of solid content) was prepared by diluting 179.9 g of pseudo boehmite having a solid content concentration of 83.4 mass % with pure water. The pseudo boehmite slurry was added to 1220.1 g of silica fine particle slurry (SI-550, manufactured by JGC Catalysts and Chemicals Ltd.) having an $SiO_2$ concentration of 20.49 mass % (250 g in terms of $SiO_2$) (first step). Next, to the stirred mixture solution (25° C.), 2500 g of magnesium oxide slurry (20 mass %, 500 g in terms of MgO, 25° C.) and 500 g of calcium carbonate slurry (20 mass %, 100 g in terms of CaO, 25° C.) were added to obtain a raw material slurry (second step).

The raw material slurry made into droplets was spray-dried with a spray dryer having an inlet temperature of 180° C. and an outlet temperature of 90° C. to obtain spherical particles having an average particle size of 80 μm.

Subsequently, 200 g of the resulting calcined particles were added to 2000 g of pure water at 60° C., and the mixture was stirred for 10 minutes. The stirred mixture was suction filtered, and the filtration residue was washed with 2000 g of pure water at 60° C. to obtain washed particles.

In an electric furnace under air atmosphere, the washed particles were dried at 120° C. for 8 hours and calcined at 600° C. for 2 hours to obtain MTR-31 (third step). On this

TABLE 4

| Test No. | | 21 | 22 | 23 | 24 | 25 | 26 |
|---|---|---|---|---|---|---|---|
| Metal trapping | | None | MTR-21 | MTR-22 | MTR-2a | MTR-2c | MTR-2e |
| Addition amount [mass %] | | 0 | 5 | 5 | 5 | 5 | 5 |
| Selectivity at the same conversion rate [77 mass %] | | | | | | | |
| Yield [mass %] | $H_2$ | 0.88 | 0.56 | 0.52 | 0.63 | 0.69 | 0.71 |
| | Dry Gas | 3.10 | 2.56 | 2.47 | 2.65 | 2.83 | 2.84 |
| | Gasoline | 49.32 | 51.31 | 51.64 | 51.10 | 50.40 | 50.39 |
| | LCO | 16.37 | 16.29 | 16.41 | 16.24 | 16.31 | 16.46 |
| | HCO + CLO | 6.63 | 6.71 | 6.59 | 6.76 | 6.69 | 6.54 |
| | Coke | 9.46 | 7.40 | 7.02 | 7.46 | 8.24 | 8.61 |
| Pulverization of catalyst | | Absent | Absent | Absent | Pulverized | Absent | Absent |
| Remarks | | Comparative Example (reference) | Invention Example | Invention Example | Comparative Example | Invention Example | Invention Example | occasion, the alkali metal content was 0.04 mass % in terms of $Na_2O$, the specific surface area was 178 m²/g, and the pore volume was 0.26 ml/g.

[MTR-32] Metal Trapping Using Silica Fine Particles Having an Average Particle Size of 4 to 5 nm and Pseudo Boehmite (MgO: 45%, $CaCO_3$: 15% (in Terms of CaO))

MTR-32 was obtained in the same manner as in the preparation of MTR-31, except that the amount of the magnesium oxide slurry was changed to 2250 g (20 mass %, 450 g in terms of MgO) and the calcium carbonate slurry to 750 g (20 mass %, 150 g in terms of CaO). On this occasion, the alkali metal content was 0.08 mass % in terms of $Na_2O$, the specific surface area was 180 m²/g, and the pore volume was 0.28 ml/g.

[MTR-33] Metal Trapping Using Silica Fine Particles Having an Average Particle Size of 4 to 5 nm and Pseudo Boehmite (MgO: 30%, $CaCO_3$: 10% (in Terms of CaO))

MTR-33 was obtained in the same manner as in the preparation of MTR-31, except that the amount of the pseudo boehmite slurry was changed to 1400 g (350 g in terms of solid content), the magnesium oxide slurry to 1500 g (20 mass %, 300 g in terms of MgO) and the calcium carbonate slurry to 500 g (20 mass %, 100 g in terms of CaO). On this occasion, the alkali metal content was 0.06 mass % in terms of $Na_2O$, the specific surface area was 140 m²/g, and the pore volume was 0.24 ml/g.

[MTR-34] Metal Trapping Using Silica Fine Particles Having an Average Particle Size of about 30 nm and Pseudo Boehmite (MgO: 30%, $CaCO_3$: 10% (in Terms of CaO))

MTR-34 was obtained in the same manner as in the preparation of MTR-33, except that 517.6 g of silica fine particles (SI-50, manufactured by JGC Catalysts and Chemicals Ltd.) (250 g in terms of $SiO_2$) was used. On this occasion, the alkali metal content was 0.08 mass % in terms of $Na_2O$, the specific surface area was 135 m²/g, and the pore volume was 0.30 ml/g.

[MTR-35] Metal Trapping Using Silica Fine Particles Having an Average Particle Size of 4 to 5 nm and Pseudo Boehmite (MgO: 50%, $CaCO_3$: 10% (in Terms of CaO), $La_2O_3$: 5%)

MTR-35 was obtained in the same manner as in the preparation of MTR-31, except that the amount of the pseudo boehmite slurry was changed to 400 g (100 g in terms of solid content) and the lanthanum oxide to 76.5 g (50 g in terms of $La_2O_3$). On this occasion, the alkali metal content was 0.10 mass % in terms of $Na_2O$, the specific surface area was 165 m²/g, and the pore volume was 0.30 ml/g.

[MTR-3a] Metal Trapping Using Water Glass in Place of Silica Fine Particles as Binder (MgO: 50%, $CaCO_3$: 10% (in Terms of CaO))

A pseudo boehmite slurry having a solid content concentration of 25 mass % was prepared by diluting 187.1 g of pseudo boehmite having a solid content concentration of 83.4 mass % (156 g in terms of solid content) with pure water. The slurry was added to 1250 g of water glass (sodium silicate) with 24 mass % of $SiO_2$ (300 g in terms of $SiO_2$, 28 g in terms of $Na_2O$) (first step). Next, to the stirred mixture solution (25° C.), 2400 g of magnesium oxide slurry (25 mass %, 600 g in terms of MgO, 25° C.) and 480 g of calcium carbonate slurry (25 mass %, 120 g in terms of CaO, 25° C.) were added to form a precipitate, so that a raw material slurry was obtained (second step). Then, the dispersion treatment was performed using a homogenizer.

The raw material slurry made into droplets was spray-dried with a spray dryer having an inlet temperature of 210° C. and an outlet temperature of 130° C. to obtain spherical particles having an average particle size of 65 μm. The spray-dried particles were calcined in an electric furnace under air atmosphere at 250° C. for 1 hour to obtain calcined particles.

To 2000 g of pure water at 60° C., 200 g of the resulting calcined particles were added, and the mixture was stirred for 10 minutes. The stirred mixture was suction filtered, and the filtration residue was washed with 2000 g of pure water at 60° C. to obtain washed particles. The washed particles were dried at 120° C. for 8 hours and calcined at 600° C. for 2 hours to obtain a metal trapping MTR-3a (third step). On this occasion, the alkali metal content was 2.34 mass % in terms of $Na_2O$, the specific surface area was 12 m²/g, and the pore volume was 0.10 ml/g.

[MTR-3b] Metal Trapping Using Silica Fine Particles Having an Average Particle Size of 4 to 5 nm (MgO: 70%, $CaCO_3$: 10% (in Terms of CaO)), Containing No Alumina Component MTR-3b was obtained in the same manner as in the preparation of MTR-31, except that no alumina component was added, and the amount of silica fine particle slurry (SI-550, manufactured by JGC Catalysts and Chemicals Ltd.) was changed to 976.1 g (200 g in terms of $SiO_2$), the magnesium oxide slurry to 3500 g (20 mass %, 700 g in terms of MgO), and the calcium carbonate slurry to 500 g (20 mass %, 100 g in terms of CaO). On this occasion, the alkali metal content was 0.54 mass % in terms of $Na_2O$, the specific surface area was 65 m²/g, and the pore volume was 0.51 ml/g.

[MTR-3c] Metal Trapping Using Silica Fine Particles Having an Average Particle Size of 4 to 5 nm and Excessive Alumina Component (MgO: 10%, $CaCO_3$: 20% (in Terms of CaO))

MTR-c was obtained in the same manner as in the preparation of MTR-31, except that the amount of the pseudo boehmite slurry was changed to 2000 g (500 g in terms of solid content), the silica fine particle slurry (SI-550, manufactured by JGC Catalysts and Chemicals Ltd.) to 976.1 g (200 g in terms of $SiO_2$), the magnesium oxide slurry to 500 g (20 mass %, 100 g in terms of MgO), and the calcium carbonate slurry to 1000 g (20 mass %, 200 g in terms of CaO). On this occasion, the alkali metal content was 0.19 mass % in terms of $Na_2O$, the specific surface area was 180 m²/g, and the pore volume was 0.42 ml/g.

[MTR-3d] Metal Trapping Using Silica Fine Particles Having an Average Particle Size of 4 to 5 nm (MgO: 40%, $CaCO_3$: 30% (in Terms of CaO))

MTR-3d was obtained in the same manner as in the preparation of MTR-31, except that the amount of the pseudo boehmite slurry was changed to 400 g (100 g in terms of solid content), the silica fine particle slurry (SI-550, manufactured by JGC Catalysts and Chemicals Ltd.) to 976.1 g (200 g in terms of $SiO_2$), the magnesium oxide slurry to 2000 g (20 mass %, 400 g in terms of MgO), and the calcium carbonate slurry to 1500 g (20 mass %, 300 g in terms of CaO). On this occasion, the alkali metal content was 0.07 mass % in terms of $Na_2O$, the specific surface area was 105 m²/g, and the pore volume was 0.39 ml/g.

[MTR-3e] Metal Trapping Using Silica Fine Particles Having an Average Particle Size of 4 to 5 nm (MgO: 30%, $CaCO_3$: 10% (in Terms of CaO))

MTR-3e was obtained in the same manner as in the preparation of MTR-31, except that the amount of the pseudo boehmite slurry was changed to 800 g (200 g in terms of solid content), the silica fine particle slurry (SI-550, manufactured by JGC Catalysts and Chemicals Ltd.) to 1952.2 g (400 g in terms of $SiO_2$), the magnesium oxide slurry to 1500 g (20 mass %, 300 g in terms of MgO), and the calcium carbonate slurry to 500 g (20 mass %, 100 g in terms of CaO). On this occasion, the alkali metal content was 0.12 mass % in terms of $Na_2O$, the specific surface area was 185 $m^2/g$, and the pore volume was 0.14 ml/g.

[MTR-3f] Metal Trapping Using Silica Fine Particles Having an Average Particle Size of 4 to 5 nm (MgO: 50%, $CaCO_3$: None)

MTR-3f was obtained in the same manner as in the preparation of MTR-31, except that the amount of the pseudo boehmite slurry was changed to 1000 g (250 g in terms of solid content), the silica fine particle slurry (SI-550, manufactured by JGC Catalysts and Chemicals Ltd.) to 1220.1 g (250 g in terms of $SiO_2$), and the magnesium oxide slurry to 2500 g (20 mass %, 500 g in terms of MgO), and no calcium carbonate slurry was added. On this occasion, the alkali metal content was 0.08 mass % in terms of $Na_2O$, the specific surface area was 168 $m^2/g$, and the pore volume was 0.30 ml/g.

[MTR-3g] Metal Trapping Using Silica Fine Particles Having an Average Particle Size of about 160 nm (MgO: 50%, $CaCO_3$: 10% in Terms of CaO)

MTR-3g was obtained in the same manner as in the preparation of MTR-31, except that 1082.7 g of silica fine particles (SPHERICA SLURRY 160) (250 g in terms of solid content) was used. On this occasion, the alkali metal content was 0.05 mass % in terms of $Na_2O$, the specific surface area was 18 $m^2/g$, and the pore volume was 0.45 ml/g.

The various compositions and performances of the metal trappings MTR-31 to MTR-35 and MTR-3a to MTR-3g prepared as described above were measured in the same manner as in Example 1, and sample conditions and performance measurement results are shown in Table 5. As a result of identification of the presence or absence of silicates for each sample by X-ray diffraction, silicates of Mg and Ca were found only in MTR-3a using water glass.

TABLE 5

| Sample No. | Binder component | | | Component composition in terms of oxide [mass %] | | | | | | Performance of product calcined at 600° C. | | | | |
|---|---|---|---|---|---|---|---|---|---|---|---|---|---|---|
| | Type of silica oxide* | Average particle size D [nm] | Alumina component | $SiO_2$ | $Al_2O_3$ | MgO | CaO | $Na_2O$ | $RE_2O_3$ | Bulk density ABD [g/ml] | Pore volume PV [ml/g] | Specific area SA [$m^2/g$] | CAI | Remarks |
| MTR-31 | SI-550 | 4 to 5 | Pseudo boehmite | 25 | 15 | 50 | 10 | 0.04 | — | 0.78 | 0.26 | 178 | 0.3 | Invention Example |
| MTR-32 | SI-550 | 4 to 5 | Pseudo boehmite | 25 | 15 | 45 | 15 | 0.08 | — | 0.76 | 0.28 | 180 | 0.2 | Invention Example |
| MTR-33 | SI-550 | 4 to 5 | Pseudo boehmite | 25 | 35 | 30 | 10 | 0.06 | — | 0.75 | 0.24 | 140 | 1.2 | Invention Example |
| MTR-34 | SI-50 | 30 | Pseudo boehmite | 25 | 35 | 30 | 10 | 0.08 | — | 0.72 | 0.30 | 135 | 3.8 | Invention Example |
| MTR-35 | SI-550 | 4 to 5 | Pseudo boehmite | 25 | 10 | 50 | 10 | 0.10 | — | 0.74 | 0.30 | 165 | 0.8 | Invention Example |
| MTR-3a | Water glass | — | Pseudo boehmite | 25 | 13 | 50 | 10 | 2.34 | — | 0.88 | 0.10 | 12 | 21.5 | Comparative Example |
| MTR-3b | SI-550 | 4 to 5 | — | 20 | — | 69 | 10 | 0.54 | — | 0.61 | 0.51 | 65 | Unmeasurable | Comparative Example |
| MTR-3c | SI-550 | 4 to 5 | Pseudo boehmite | 20 | 50 | 10 | 20 | 0.19 | — | 0.66 | 0.42 | 180 | 15.0 | Invention Example |
| MTR-3d | SI-550 | 4 to 5 | Pseudo boehmite | 20 | 10 | 40 | 30 | 0.07 | — | 0.69 | 0.39 | 105 | 13.0 | Invention Example |
| MTR-3e | SI-550 | 4 to 5 | Pseudo boehmite | 40 | 20 | 30 | 10 | 0.12 | — | 0.83 | 0.14 | 185 | 0.1 | Invention Example |
| MTR-3f | SI-550 | 4 to 5 | Pseudo boehmite | 25 | 25 | 50 | 0 | 0.08 | — | 0.74 | 0.30 | 168 | 2.5 | Invention Example |
| MTR-3g | SUPHERICA SLURRY 160 | 160 | Pseudo boehmite | 25 | 15 | 50 | 10 | 0.05 | — | 0.72 | 0.45 | 18 | Unmeasurable | Comparative Example |

*The types of silicon oxide other than water glass represent variety of silicon oxide-based sols.
—: Not applicable

[Evaluation Result of Attrition]

As shown in Table 5, MTR-31 to 35, and 3c to 3f of the invention examples have sufficient attrition resistance with an attrition resistance index CAI in the range of 0.1 to 18. In contrast, MTR-3a, 3b and 3g have excessively high attrition resistance index CAI or unmeasurable CAI, having insufficient strength when blended with a fluid catalytic cracking catalyst.

Example 6

[Performance Evaluation of Fluid Catalytic Cracking Catalyst Containing Metal Trapping]

In order to check the effect of addition of the metal trapping according to embodiments of the present invention, 5% of each of the metal trappings MTR-31, 32, 3a, 3e and 3f prepared in Example 5 was blended with the fluid catalytic cracking catalyst composition using an alumina binder, so that a fluid catalytic cracking catalyst composition was prepared and performance evaluation was performed. The fluid catalytic cracking catalyst used contains 12.5 mass % of an alumina binder, 25 mass % of zeolite, 35 mass % of activated alumina, 18 mass % of kaolin, and 4.5 mass % of rare earth elements in terms of $RE_2O_3$, having a specific surface area of 276 m²/g and a pore volume of 0.36 ml/g.

<Preparation of Fluid Catalytic Cracking Catalyst Composition for Blending with Metal Trapping>

First, 547.5 g of an aqueous basic aluminum chloride solution having a concentration of 22.83 mass % in terms of alumina and 593.2 g of pure water were mixed and stirred. Next, to the mixture solution, 833.3 g of a zeolite slurry having a concentration of 30 mass % was added, and as additives, 222.5 g of kaolin as clay mineral component (solid content: 81 mass %), 453.9 g of activated alumina as active matrix component (solid content: 77 mass %), and 207.0 g of an aqueous lanthanum chloride solution having a concentration of 21.74 mass % in terms of $RE_2O_3$ were sequentially added to obtain a raw material slurry. Dispersion treatment was performed using a homogenizer, and the resulting raw material slurry had a solid content concentration of 35% and a pH of 4.9.

The raw material slurry made into droplets was spray-dried with a spray dryer having an inlet temperature of 250° C. and an outlet temperature of 150° C. to obtain spherical particles having an average particle size of 65 µm. The spray-dried particles were calcined in an electric furnace under air atmosphere at 450° C. for 1 hour to obtain calcined particles.

To 1500 g of pure water at 60° C., 300 g of the resulting calcined particles were added, and the mixture was stirred for 5 minutes. The pH of the slurry was 3.6. After suction filtration, the filtration residue was washed with 1500 g of pure water at 60° C. to obtain a washed particle cake (1).

After 1500 g of pure water at 60° C. and the washed particle cake (1) were mixed and resuspended, 30.5 g of ammonium sulfate was added, and the mixture was stirred for 20 minutes. After suction filtration, the filtration residue was washed with 1500 g of pure water at 60° C. to obtain a washed particle cake (1').

After 1500 g of pure water at 60° C. and the washed particle cake (1') were mixed and resuspended, 29 g of a lanthanum chloride aqueous solution at a concentration of 22 mass % as polyvalent cation source for ion exchange of zeolite was added thereto, and the mixture was stirred for 20 minutes. After suction filtration, the filtration residue particles were washed with 1500 g of pure water at 60° C. After repetition of the operation twice, the filtration residue particles were dried at 135° C. for 2 hours to obtain a fluid catalytic cracking catalyst composition.

[Performance Evaluation Test of Catalyst]

A fluid catalytic cracking catalyst was prepared by blending each metal trapping with the catalyst composition obtained as described above, and a performance evaluation test of the catalyst was performed using the same crude oil under the same reaction conditions based on ACE-MAT (Advanced Cracking Evaluation-Micro Activity Test). The results of the performance evaluation test of each catalyst are shown in Table 6. Each yield is shown at the same conversion rate, that is, 77 mass % here, and expressed by percentage of the mass of each component in the produced oil based on the mass of the raw oil.

However, before the performance evaluation tests, 1000 mass ppm of nickel (mass of nickel divided by mass of catalyst) and 2000 mass ppm of vanadium (mass of vanadium divided by mass of catalyst) were deposited on the surface of each catalyst, and a pseudo equilibration treatment was then performed by steaming. Specifically, after each catalyst was calcined at 600° C. for 2 hours, a predetermined amount of toluene solution of nickel naphthenate and vanadium naphthenate was absorbed therein. Subsequently, the catalyst was dried at 110° C., and then calcined at 600° C. for 1.5 hours. Subsequently, the catalyst was subject to steam treatment at 780° C. for 13 hours.

Operating conditions in the performance evaluation test are as follows.

Raw oil: Desulfurized atmospheric residual oil (DSAR)+ Desulfurized vacuum gas oil (DSVGO) (50+50)
Mass ratio of catalyst/oil throughput (C/O): 3.75, 5.0
Reaction temperature: 520° C.
1) Conversion rate=100−(LCO+HCO+CLO) (mass %)
2) Measurement was performed at a mass ratio catalyst/oil of 3.75 or 5.0, and each yield at the same conversion rate (=77 mass %) was determined by interpolation.
3) Boiling point range of gasoline: 30 to 216° C. (gasoline)
4) Boiling point range of LCO: 216 to 343° C. (LCO: light cycle oil)
5) Boiling point range of HCO and CLO: 343° C.+(HCO: heavy cycle oil, CLO: clarified oil)
6) LPG (liquefied petroleum gas)
7) Dry Gas: methane, ethane and ethylene

TABLE 6

| Test No. | 31 | 32 | 33 | 34 | 35 | 36 |
|---|---|---|---|---|---|---|
| Metal trapping | None | MTR-31 | MTR-32 | MTR-3a | MTR-3e | MTR-3f |
| Addition amount [mass %] | 0 | 5 | 5 | 5 | 5 | 5 |
| Selectivity at the same conversion rate [77 mass %] | | | | | | |
| Yield [mass %] H₂ | 0.88 | 0.55 | 0.52 | 0.63 | 0.72 | 0.71 |
| Dry Gas | 3.10 | 2.55 | 2.50 | 2.65 | 2.85 | 2.84 |
| Gasoline | 49.32 | 51.11 | 51.29 | 51.1 | 50.4 | 50.39 |
| LCO | 16.37 | 16.27 | 16.28 | 16.24 | 16.25 | 16.46 |
| HCO + CLO | 6.63 | 6.73 | 6.72 | 6.76 | 6.75 | 6.54 |
| Coke | 9.46 | 7.37 | 7.11 | 7.46 | 8.60 | 8.61 |
| Pulverization of catalyst | Absence | Absence | Absence | Pulverized | Absence | Absence |
| Remarks | Comparative Example (reference) | Invention Example | Invention Example | Comparative Example | Invention Example | Invention Example |

[Evaluation Results of Catalyst Activity]

According to the evaluation results of catalyst activity, in the performance evaluation results of the catalysts containing 5% of the metal trapping MTR-31, 32, 3a, 3e or 3f prepared in Example 5 (yield at the same conversion rate (77%)), it is apparent that the yield of $H_2$, dry gas and coke decreases, and the yield of gasoline increases in comparison with 100% of a matrix catalyst containing no metal trapping (test No. 31: reference). Further, it is apparent that the catalyst containing the metal trapping MTR-31 or 32 having a composition in a suitable range has particularly higher improvement in the yield of $H_2$, coke, dry gas and gasoline in comparison with the catalysts containing MTR-3a, 3e or 3f. Incidentally, although having a higher improvement ratio than the catalyst containing the metal trapping MTR-3e or 3f, the catalyst containing the metal trapping MTR-3a was unable to be used in practice due to high pulverization ratio.

As described above, having high metal trapping ability and attrition resistance, the metal trapping according to embodiments of the present invention is added to a fluid catalytic cracking catalyst for cracking a hydrocarbon oil containing nickel or vanadium, with the function of the catalyst stably maintained for a long period of time, which is preferable. Although the fluid catalytic cracking catalyst uses an alumina binder in the examples described above, other binders or additives may be suitably combined for use.

The invention claimed is:

1. A metal trapping comprising:
    a binder component containing 50 mass % or more silicon oxide,
    one or two selected from an alumina component and a clay mineral, and
    a compound comprising Group II elements as a first metal component, wherein
    the binder component is at least one of an aqueous solution and fine particles (sol) having an average particle size in the range of 4 to 100 nm,
    the content of the first metal component in terms of oxide is 20 to 80 mass %,
    the metal trapping has no peak of silicate of the first metal component detected in X-ray diffraction analysis, and has an attrition resistance index CAI of 0.1 to 18.

2. The metal trapping according to claim 1, wherein the content of the binder in terms of oxide is in the range of 10 to 30 mass % with respect to the metal trapping.

3. The metal trapping according to claim 1, wherein the content of the alumina component and the clay mineral in terms of oxide is in the range of 5 to 40 mass % in total with respect to the metal trapping.

4. The metal trapping according to claim 1, wherein the metal trapping has an average particle size in the range of 40 to 100 μm, a specific surface area in the range of 3 to 200 $m^2/g$, and a pore volume of 0.05 to 0.50 ml/g.

5. The metal trapping according to claim 1, wherein the first metal component comprises magnesium and calcium.

6. The metal trapping according to claim 1, the metal trapping further comprising alkali metal elements at a content of 2.0 mass % or less in terms of oxide $M_2O$.

7. The metal trapping according to claim 1, the metal trapping further comprising an oxide of rare-earth element as a second metal component.

8. The metal trapping according to claim 7, wherein the second metal component is one or two selected from lanthanum and cerium.

9. The metal trapping according to claim 7, wherein the content of the second metal component is 20 mass % or less in terms of oxide with respect to the metal trapping.

10. The metal trapping according to claim 7, wherein the content ratio of the second metal component to the first metal component in terms of oxide is 0.01 to 0.20.

11. A method of producing the metal trapping according to claim 1, comprising:
    a first step of obtaining a mixed slurry of silicon oxide (silica-based) by adding at least one selected from a group consisting of an alumina component, an alumina component precursor and a clay mineral to a binder containing a silicon oxide (silica-based);
    a second step of obtaining a metal trapping precursor by mixing the mixed slurry of silicon oxide (silica-based) with a compound of the first metal component, and further, optionally with a compound of a second metal component, and heating the mixed slurry of metal component; and
    a third step of obtaining a metal trapping by drying and calcining the metal trapping precursor.

12. The method of producing the metal trapping according to claim 11, wherein a washing step is added between drying and calcining in the third step.

13. A fluid catalytic cracking catalyst comprising the metal trapping according to claim 1, a zeolite component, a binder component, and a clay mineral component.

14. The fluid catalytic cracking catalyst according to claim 13, which further comprises an additive having an active matrix component.

* * * * *